United States Patent
Arya et al.

[19]

[11] Patent Number: 6,055,132
[45] Date of Patent: Apr. 25, 2000

[54] INTEGRATED LEAD SUSPENSION FLEXURE FOR ATTACHING A MICRO-ACTUATOR WITH A TRANSDUCER SLIDER

[75] Inventors: Satya Prakash Arya; Long-Sheng Fan; Toshiki Hirano; Tzong-Shii Pan; Surya Pattanaik; Victor (Wing Chun) Shum, all of San Jose, Calif.

[73] Assignee: Internatinal Business Machines Corporation, Armonk, N.Y.

[21] Appl. No.: 09/090,455

[22] Filed: Jun. 4, 1998

[51] Int. Cl.⁷ .................................................. G11B 5/48
[52] U.S. Cl. ............................................................ 360/104
[58] Field of Search .................................... 360/103–104

[56] References Cited

U.S. PATENT DOCUMENTS

| | | | |
|---|---|---|---|
| 4,731,685 | 3/1988 | Orcutt | 360/106 |
| 4,996,623 | 2/1991 | Erpelding et al. | 360/104 |
| 5,189,578 | 2/1993 | Mori et al. | 360/106 |
| 5,530,606 | 6/1996 | Baasch et al. | 360/104 |
| 5,594,607 | 1/1997 | Erpelding et al. | 360/104 |
| 5,612,840 | 3/1997 | Hiraoka et al. | 360/104 |
| 5,657,188 | 8/1997 | Jurgenson et al. | 360/106 |
| 5,768,062 | 6/1998 | Anderson et al. | 360/106 |
| 5,818,662 | 10/1998 | Shum | 360/104 |
| 5,856,896 | 1/1999 | Berg et al. | 360/104 |
| 5,864,445 | 1/1999 | Bennin et al. | 360/104 |
| 5,898,541 | 4/1999 | Boutaghou et al. | 360/109 |
| 5,901,430 | 5/1999 | Ziegler et al. | 29/603.06 |
| 5,914,834 | 6/1999 | Gustafson | 360/104 |
| 5,924,187 | 6/1999 | Matz | 29/603.03 |
| 5,982,585 | 11/1999 | Fan et al. | 360/104 |

FOREIGN PATENT DOCUMENTS

| | | |
|---|---|---|
| 0 242 597 | 10/1987 | European Pat. Off. . |
| 61-233411 | 10/1986 | Japan . |
| 63-291271 | 11/1988 | Japan . |
| 3-245315 | 10/1991 | Japan . |
| 8-180623 | 7/1996 | Japan . |

OTHER PUBLICATIONS

Magnetic Head Suspension Assembly, IBM Technical Disclosure Bulletin, Mar. 1982, vol. 24, No. 10, p 4915.

Actuator Assembly For A Disk File, IBM Technical Disclosure Bulletin, Oct. 1977, vol. 20, No. 5, pp 1984–1985.

*Primary Examiner*—Brian E. Miller
*Attorney, Agent, or Firm*—John H. Holcombe

[57] ABSTRACT

Disclosed is an integrated lead suspension flexure attachment structure for a micro-actuator with a slider/transducer assembly attached thereto, having a plurality of electrical terminals for both the micro-actuator and the transducer. The suspension provides low gimbal stiffness and allows the slider to have correct pitch and roll static attitudes. An attachment platform is provided for mechanically attaching the micro-actuator. Two elongate cantilever compliance members extend from the transducer edge and the opposite edge of the attachment platform. Two lead termination platforms are provided, each at the distal end of one of the compliance members. The lead termination platforms extend laterally to either side of the compliance members. Electrical leads are positioned laterally of each of the lead termination platforms on either side, and loop towards the compliance member to the lead termination platform to reduce stiffness of the leads. The two lead termination platforms each supports the electrical leads at either side of the compliance member and the compliance members allow flex between the attachment platform and the lead terminations for connecting the leads to the micro-actuator.

36 Claims, 8 Drawing Sheets

INTEGRATED LEAD SUSPENSION FLEXURE FOR ATTACHING A MICRO-ACTUATOR WITH A TRANSDUCER SLIDER

TECHNICAL FIELD

This invention relates to integrated lead suspensions for data recording disk drives, and more particularly to a suspension flexure structure for mechanically and electrically attaching a micro-actuator with a a slider/transducer assembly attached thereto, the micro-actuator with a slider/transducer assembly attached thereto having a plurality of electrical terminals.

BACKGROUND OF THE INVENTION

Data recording disk drives, such as magnetic disk drives, store information on concentric tracks of a data surface of a rotatable magnetic recording disk. A slider rides on an air bearing generated between the rotating disk data surface and a transducer on the slider and reads data from and writes data to the data surface. The transducer slider is attached to a flexure of a suspension and is moved generally radially from track to track by an actuator. The suspension typically includes a load beam which is attached to an arm of the actuator, and the flexure. While the disk rotates, the load beam provides a resilient spring action which supports the flexure and slider against the air bearing, and the flexure allows the slider to gimbal to adjust its orientation for unavoidable disk surface flatness variations, while maintaining the transducer in a close relationship with the disk surface. Specifically, the flexure provides controlled flexibility in pitch and roll motion of the slider relative to its direction of motion on the rotating disk surface, and resistance to yaw motion so that the transducer will maintain a constant radial position.

The transducer typically includes separate write and read heads, each requiring two electrical leads for interconnecting the transducer with an electronics module which includes a write and a read channel. The electronics module may comprise separate electronic components distributed throughout the disk drive. One type of suspension is a composite or laminate structure including a flexure, for example of a thin stainless steel, with electrical insulation and patterned electrical leads formed thereon, commonly called an integrated lead suspension. The patterned electrical leads for the heads are routed along the actuator arm, load beam, and/or flexure and may briefly separate from the flexure and are routed to the slider for connection to the transducer. The slider is mechanically attached to the flexure, and the patterned electrical leads are electrically connected to terminations for the four electrical leads of the write and read transducer. Assignee's copending U.S. Patent application Ser. No. 08/726,116, filed Oct. 4, 1996, describes examples of such integrated lead suspensions for providing a mechanical connection for the slider and electrical connections for the transducer, all of the electrical leads supported by a flexibly connected extension to the flexure.

The disk drive actuator typically comprises a linear or rotary voice coil motor which moves the actuator arm and the attached suspension and slider to position the transducer at the desired track of the data surface, and, under the control of a servo control system, to utilize servo information on the data surface to closely follow any runout or other radial displacement of the track as the disk is rotated. As the tracks are made thinner and placed closer together (in order to increase the density of the tracks and thereby the data capacity of a disk surface), it becomes increasingly difficult for the actuator and the servo control system to quickly and accurately position and the transducer over the desired track and to provide track following. For example, a servo control system with a voice coil motor will have difficulty achieving a servo loop bandwidth greater than 1 KHz.

Micro-actuators have been proposed for attachment to the suspension to provide a fine positioning of the transducer while the actuator provides a course positioning. Examples of micro-actuators are shown in U.S. Pat. No. 5,657,188 and in U.S. Pat. No. 5,189,578. The micro-actuators of the patents are shown as being located on the load beam and the actuator arm, respectively, but a better location is between the flexure and the slider so that the micro-actuator does not have to move the mass of the load beam and suspension in addition to that of the slider.

A difficulty in locating the micro-actuator between the flexure and the slider is that the micro-actuator requires wiring for operation with a servo control system. This wiring is in addition to the wiring required for the write and read heads of the transducer, and needs to be provided in the same limited space without adversely affecting the stiffness of the flexure.

The mechanical attachment of the micro-actuator and of the slider to the flexure must be at a correct orientation with limited residual stress to assure that the slider will approach the disk surface at the correct orientation so that it will generate the needed air bearing. Along with adhesive bonding of the micro-actuator to the flexure, a large number (typically 8 or more) of electrical leads must also be connected to the micro-actuator and to the transducer. This large number of leads at one end of the slider will have a number of individual misalignments with the associated terminals, which accumulate and cause forces and moments tending to alter the pitch and roll static attitude of the suspension.

It may be possible to force the termination lead platforms into alignment, but once the adhesive is cured, and the suspension is taken out of the fixture, the spring back forces may bias the pitch or roll static attitude of the suspension.

Thus, in either case, the slider may approach the disk surface at an incorrect orientation so that it will not generate the needed air bearing.

SUMMARY OF THE INVENTION

It is an object of the present invention to provide an integrated lead suspension for a micro-actuator with a slider/transducer assembly attached thereto which provides low gimbal stiffness and allows the slider to have a correct pitch and roll static attitude.

Disclosed is an integrated lead suspension flexure attachment structure for a micro-actuator and transducer slider, for both mechanically attaching the micro-actuator, and for electrically connecting electrical leads to electrical terminals for both the micro-actuator and the transducer. The integrated lead suspension flexure attachment structure comprises an attachment platform for mechanically attaching the micro-actuator with a slider/transducer assembly attached thereto. Two elongate cantilever compliance members extend from opposite edges of the attachment platform, each having a cantilever end at the attachment platform and having a distal end. Two lead termination platforms are provided, each at the distal end of one of the cantilever compliance members. Ones of a plurality of electrical leads are separately supported by each of the two lead termination platforms for electrically connecting to ones of the plurality of electrical terminals positioned at opposite ends of the micro-actuator with a slider/transducer assembly attached thereto.

Each of the elongate cantilever compliance members is bent first away from the micro-actuator with a slider/transducer assembly attached thereto and then oppositely to substantially parallel to the flexure attachment platform to thereby vertically space a portion of the elongate cantilever compliance member, the distal end of the elongate cantilever compliance member, and the lead termination platform from the micro-actuator with a slider/transducer assembly attached thereto. This space allows freedom of movement of the micro-actuator attachment platform without interference from the rest of the suspension as the slider gimbals to follow the disk contour while flying.

The flexure additionally comprises legs at each side of the attachment platform, spaced laterally therefrom, and vertically spaced away from the micro-actuator with a slider/transducer assembly attached thereto. The flexure legs support a length of each of the ones of the electrical leads which are supported by one of the lead termination platforms, such as the lead termination platform at the rear of the micro-actuator and transducer slider where the transducer is located. The electrical leads loop therefrom toward the elongate cantilever compliance member and to the one lead termination platform to further allow freedom of movement for the one lead termination platform.

The flexure additionally comprises a support area vertically spaced away from the micro-actuator with a slider/transducer assembly attached thereto. The support area supports a length of each of the ones of the electrical leads which are supported by the other of the lead termination platforms, such as the lead termination platform at the front of the micro-actuator and transducer slider opposite the transducer. The electrical leads looping from the support area first laterally away and then toward the elongate cantilever compliance member and to the other lead termination platform to further allow freedom of movement for the other lead termination platforms.

Preferably, each of the lead termination platforms extends laterally to both sides of the elongate cantilever compliance members substantially equidistant on each the side thereof, and also preferably, an equal number of leads is supported by the lead termination platforms on each side of the elongate cantilever compliance member.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
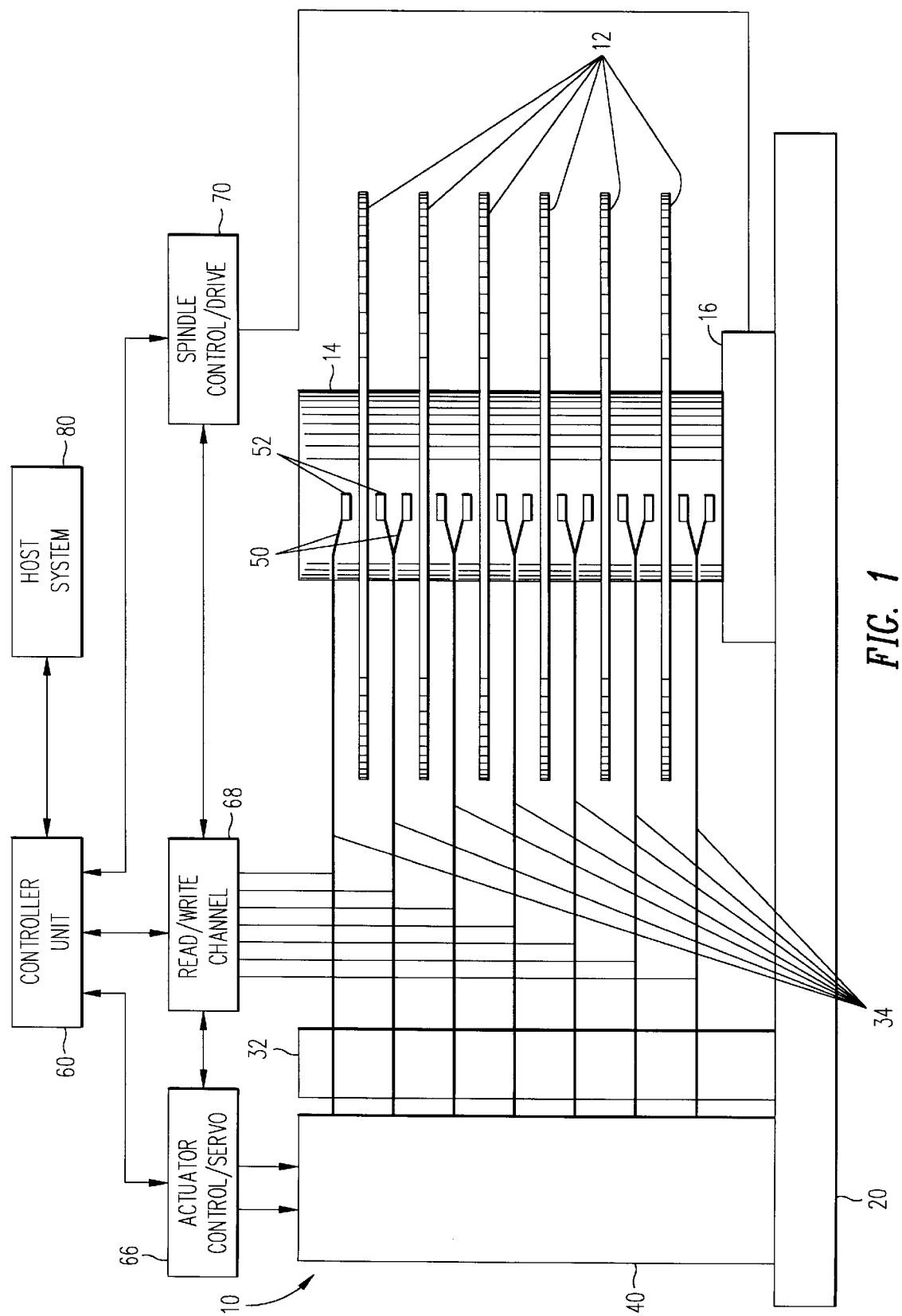
FIG. 1 is a block diagrammatic representation of a data recording disk drive system and controller implementing the integrated lead suspension of the present invention.
Figure 2:
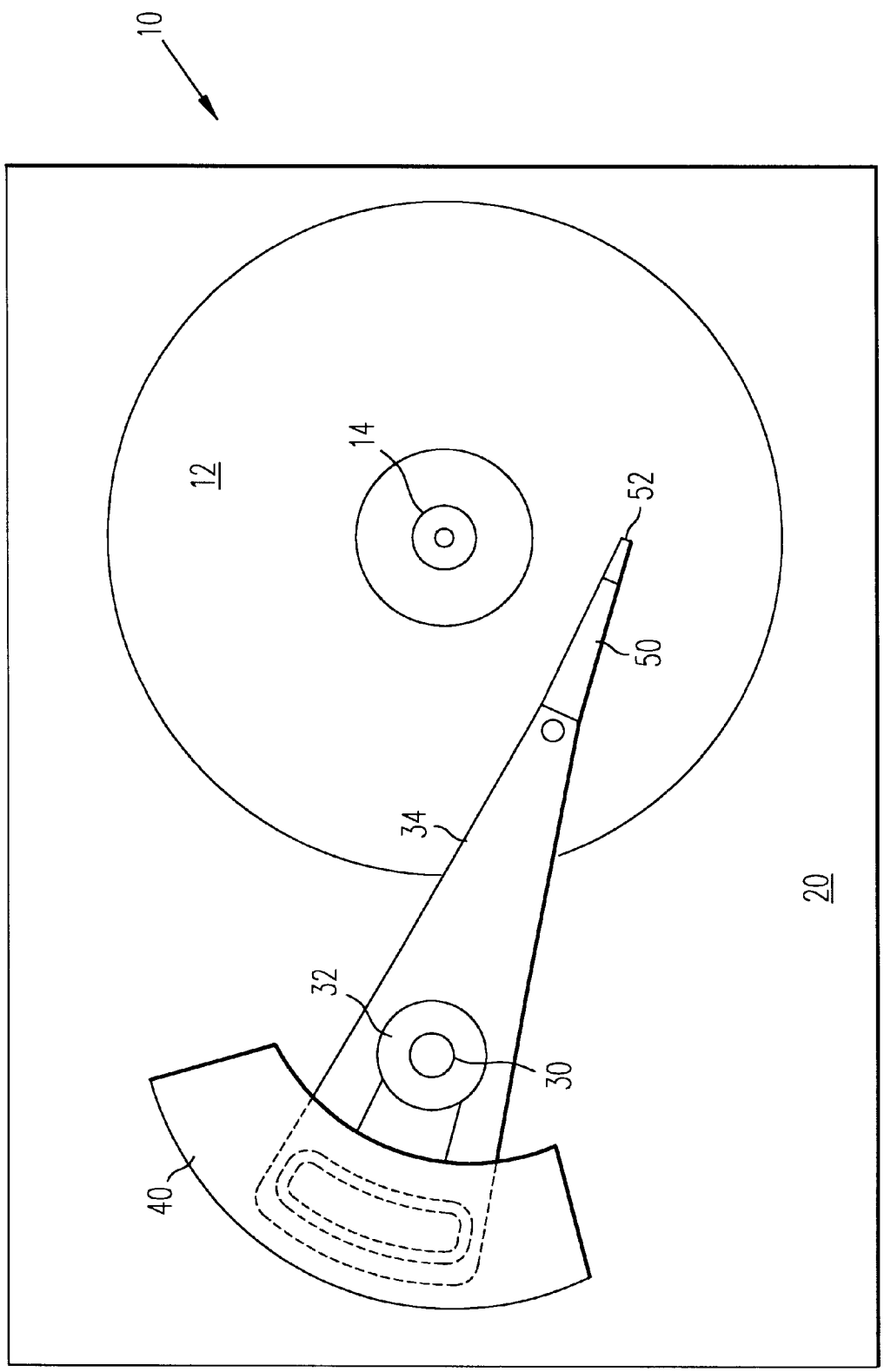
FIG. 2 is a diagram top view of the data recording disk drive system of FIG. 1.

FIGS. 1 and 2 illustrate a data recording disk drive system, such as a magnetic disk drive system, designated by the general reference number 10. The magnetic disk drive system 10 comprises at least one, and preferably a plurality of stacked magnetic disks 12 mounted to a spindle 14. The disks 12 comprise a flat substrate with a thin film magnetic data recording surface, typically on each side. The spindle 14 and mounted disks 12 are rotated by a spindle motor 16 about a central axis of the spindle. A chassis 20 provides a housing for the magnetic disk drive system 10, attaching the spindle motor 16 and an actuator shaft 30. An actuator hub 32 rotates about the actuator shaft 30 and supports a stack of actuator arms 34, called a "comb". A rotary voice coil motor 40 is attached to the chassis 20 and to the rear of the actuator arms 34.

A plurality of suspension assemblies 50 are attached to the actuator arms 34. A plurality of transducers and sliders 52 are attached to the suspension assemblies 50. The transducers and sliders 52 each is in close proximity to a data surface of a disk 12 and rides on an air bearing generated between the rotating disk data surface and the slider, and the transducer is in electromagnetic communication with the data surface and reads data from and writes data to the data surface. The suspension 50 typically includes a load beam which is attached to an arm 34 of the actuator, and the flexure. While the disk rotates, the load beam provides a resilient spring action which supports the flexure and slider against the air bearing, and the flexure allows the slider to gimbal to adjust its orientation for unavoidable disk surface flatness variations, while maintaining the transducer in a close relationship with the disk surface. Specifically, the flexure provides controlled flexibility in pitch and roll motion of the slider relative to its direction of motion on the rotating disk surface, and resistance to yaw motion so that the transducer will maintain a constant radial position.

The rotary voice coil motor 40 rotates actuator arms 34 about the actuator shaft 30 in order to move the suspension assemblies 50 to the desired radial position on disks 12. The shaft 30, hub 32, arms 34 and motor 40 may be referred to collectively as a rotary actuator assembly.

A controller 60 provides overall control to the disk drive system 10. The controller 60 typically includes a processor, a memory and other digital circuitry. The controller 60 is coupled to an actuator control/servo 66, which is in turn coupled to rotary voice coil motor 40 and to micro-actuators at sliders 52. The controller 60 may select the one of the tracks on the data surfaces to seek to with the rotary actuator assembly, called a "cylinder", and may select the one of the transducers and sliders 52 to make active and thereby select the specific data surface to read and/or write. The data recorded on the track, and servo information for the actuator control/servo 66 are sensed by the transducer and supplied to a read/write channel 68. The actuator control/servo 66 may operate the rotary actuator voice coil motor 40 to follow the selected track as a "coarse" track follower, and operate the micro-actuator to follow the track as a "fine", or high frequency, track follower. The read/write channel 68 also supplies recording signals to the transducer and slider 52. A spindle control/drive 70 may operate the spindle motor 16 to maintain a constant velocity and to stop, or, if implemented in a portable computer, may slow the motor under certain circumstances. The controller unit 60, the spindle control/drive 70, the read/write channel 68 and the actuator control/servo 66 comprises an electronics module of the data recording drive. The electronics module may comprise separate components arranged throughout the data recording drive.

A host system 80, typically a computer system, is connected to the controller unit 60. The host system 80 may send digital data to the controller 60 to be stored on disks 12, or it may request that digital data at a specified location be read from the disks 12 and sent to the host system.

Figure 3:
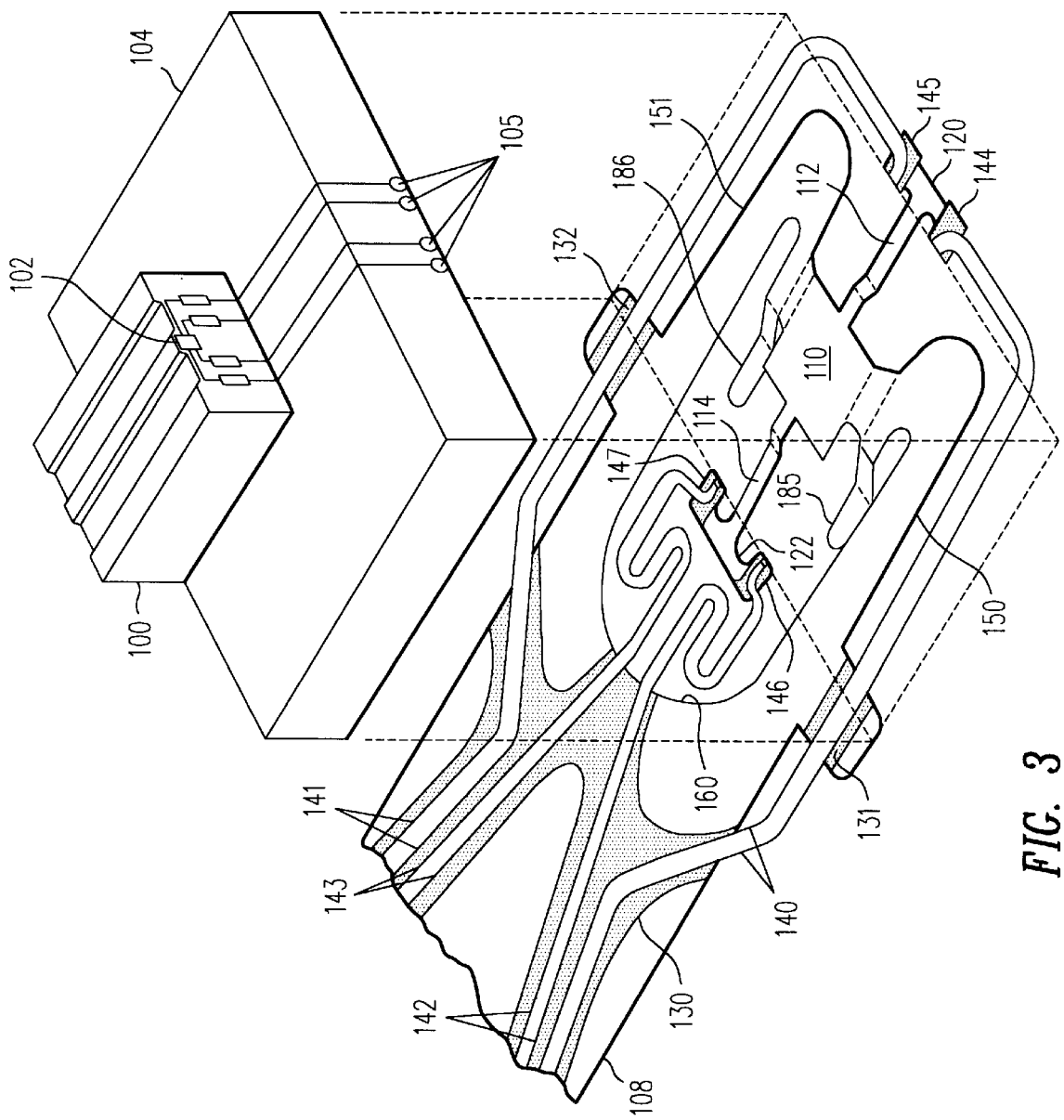
FIG. 3 is a perspective view representation of an embodiment of the integrated lead suspension flexure of the present invention with an exploded perspective view representation of a micro-actuator and transducer slider.
Figure 4:
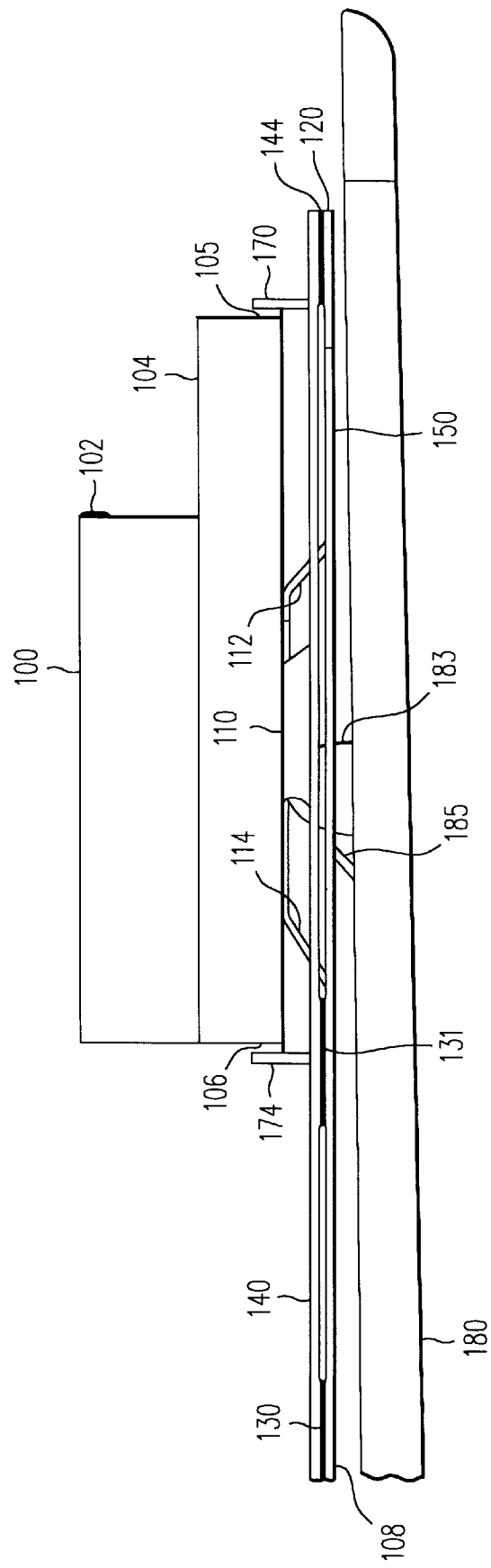
FIG. 4 is a side view representation of the integrated lead suspension flexure and micro-actuator and transducer slider of FIG. 3, supported by a load beam.

FIGS. 3 and 4 illustrate one embodiment of the integrated lead suspension flexure attachment structure for a transducer slider of the present invention.

A slider 100 has a transducer 102 thereon, and the slider rides on an air bearing generated between the rotating disk data surface and the slider and the transducer 102 reads data from and writes data to the data surface. The transducer typically includes separate write and read heads, each requiring two electrical leads for interconnecting the transducer with the read/write channel of FIG. 1. The slider 100 is mounted on the micro-actuator 104. As discussed above, a servo control system with a voice coil motor will have difficulty achieving a servo loop bandwidth greater than 1 KHz. Thus, micro-actuators have been proposed for attachment to the suspension to provide a fine positioning of the transducer while the actuator provides a coarse positioning. Examples of micro-actuators are shown in U.S. Pat. No. 5,657,188 and in U.S. Pat. No. 5,189,578. The integrated lead suspension of the present invention allows the micro-actuator 104 to be attached between the suspension and the slider 100.

Still referring to FIGS. 3 and 4, in accordance with the present invention, the electrical terminations 105 for the transducer 102 are provided at one end of the micro-actuator 104, and the electrical terminations 106 for the micro-actuator 104 are provided at the opposite end of the micro-actuator.

The integrated lead suspension flexure attachment structure comprises a composite or laminate structure including a flexure 108, for example of a thin stainless steel, with electrical insulation and patterned electrical leads formed thereon. The flexure includes an attachment platform 110 for mechanically attaching the micro-actuator 104 with transducer slider 102, for example, by adhesive bonding. The flexure attachment platform 110 is held during bonding so that the slider 102, when the micro-actuator 104 is attached to the attachment platform 110, is at a correct orientation to assure that the slider will approach the disk surface at the correct attitude so that it will generate the needed air bearing.

In accordance with the present invention, two elongate cantilever compliance members 112 and 114 extend from opposite edges of the attachment platform 110, each having a cantilever end at the attachment platform 110 and having a distal end. Two lead termination platforms 120 and 122 are provided, each at the distal end of one of the cantilever compliance members 112 and 114, respectively. The cantilever compliance members 112 and 114 may easily flex in the pitch and roll directions. The two compliance members may thus allow the lead termination platforms to move in the vertical direction or rotate in the vertical planes.

At the same time, the two cantilever compliance members 112 and 114 provide low stiffness in the lateral direction and in the yaw direction.

Each of the elongate cantilever compliance members 112 and 114 is bent first away from the micro-actuator with a slider/transducer assembly attached thereto and then oppositely to substantially parallel to the flexure attachment platform to thereby vertically space a portion of the elongate cantilever compliance member, the distal end of the elongate cantilever compliance member, and the lead termination platform 120 and 122 from the micro-actuator with a slider/transducer assembly attached thereto. This spacing gives the elongate cantilever compliance members sufficient space in which to twist or to move vertically to provide the above-described freedom of movement.

Electrical insulation 130, 131, and 132, and patterned electrical leads 140–143 are formed on the flexure 108. The electrical insulation separates the electrical leads from the flexure. The patterned electrical leads are routed along the actuator arm, load beam, and flexure and may briefly separate from the flexure and are routed to the lead termination platforms 120 and 122.

The flexure 108 additionally comprises legs 150 and 151 at each side of the attachment platform 110, spaced laterally therefrom, and vertically spaced away from the micro-actuator with a slider/transducer assembly attached thereto. The flexure legs 150 and 151 support a length of each of the ones of the electrical leads 140–141 which are directed to the lead termination platform 120 at the rear of the micro-actuator 104 and transducer slider 100 where the transducer 102 is located. The electrical leads 140–141 loop from the flexure legs 150 and 151 from their position laterally outside of the platform 110 toward the elongate cantilever compliance member 112 and to the one lead termination platform 120.

The flexure 108 additionally comprises a support area 160 vertically and longitudinally spaced away from the micro-actuator 104 with transducer slider 100. The support area 160 supports a length of each of the ones of the electrical leads 142–143 which are directed to the other of the lead termination platforms 122, which is at the front of the micro-actuator 104 and opposite the transducer 102, for connection to the micro-actuator. The electrical leads 142–143 loop first laterally away from and then toward the elongate cantilever compliance member 114 and to the other lead termination platform 122.

By looping in this manner, the leads 140–143 are more flexible and provide less stiffness than the stiffness of non-looped leads added together. Thus, the integrated lead suspension flexure attachment structure in accordance with the present invention provides high flexibility to the lead termination platforms 120 and 122.

Preferably, each of the lead termination platforms 120 and 122 extends laterally to both sides of the elongate cantilever compliance members 112 and 114 and substantially equidistant on each the side thereof, the elongate cantilever compliance members forming a central axis along the attachment platform 110. An equal number of leads may be supported by the lead termination platforms on each side of the elongate cantilever compliance member and respectively symmetrically disposed about the central axis formed by the elongate cantilever compliance members 112 and 114.

The electrical leads are supported on electrical insulation layers 144–147, as part of the laminated structure. Preferably, the electrical leads 140–141 first extend beyond the distal end of the cantilever compliance member 112 then loop back to the lead termination platform 120, and are positioned on the lead termination platform attached to the cantilever compliance member, facing the electrical connection terminals 105. Similarly, the electrical leads 142–143 first extend beyond the distal end of the cantilever compliance member 114 then loop back to the lead termination platform 122, and are positioned on the lead termination platform attached to the cantilever compliance member 114, facing the electrical connection terminals 106.

Thus, ones of the plurality of electrical leads are separately supported by each of the two lead termination platforms 120 and 122. Although equal numbers of electrical leads are shown for attaching the transducer and micro-actuator, additional leads may be required for the micro-actuator or slider or both. The electrical leads are separately routed and supported on the lead termination platforms for electrically connecting to ones of the plurality of electrical terminals positioned at opposite ends of the micro-actuator with a slider/transducer assembly attached thereto.

In the embodiment of FIGS. 3 and 4, the electrical connections between the electrical leads 140–141 and the terminals 105, and between the electrical leads 142–143 and the terminals 106, are illustrated as "bent lead" connections 170–174. Bent lead connections are known to those of skill in the art.

In accordance with the present invention, connections of any type, including bent lead connections may be made with the terminals 105 for the transducer 102 and with the terminals 106 for the micro-actuator 104 with minimal misalignment or spring back forces to the attachment of the micro-actuator and transducer slider at attachment platform 110. Misalignments are allowed by the two compliance members 112 and 114 which move in the vertical dimension or oppositely in the vertical dimension, so as to allow freedom of movement in both the vertical direction and rotation in the vertical plane.

At the same time, the two cantilever compliance members 112 and 114 provide stiffness in the lateral dimension and in the yaw dimension, and insure that the lead termination platforms are aligned with the electrical terminations 105 for the transducer 102 and the electrical terminations 106 for the micro-actuator 104.

Thus, the large number of leads to the micro-actuator and to the transducer are not at one end of the slider, but rather are split between the two ends. Thus, although there may be a number of individual misalignments with the associated terminals, they do not accumulate due to the flexibility of the elongate cantilever compliance members. Further, very minimal spring back forces and moments are created. Once the suspension is taken out of a manufacturing fixture there are minimal spring back forces to bias the pitch static attitude of the suspension, and the slider is instead at the correct attitude to generate the correct air bearing of the disk.

The present invention thus provides an integrated lead suspension for a micro-actuator with a slider/transducer assembly attached thereto which provides low gimbal stiffness and allows the slider to have correct pitch and roll static attitudes.

Figure 5:
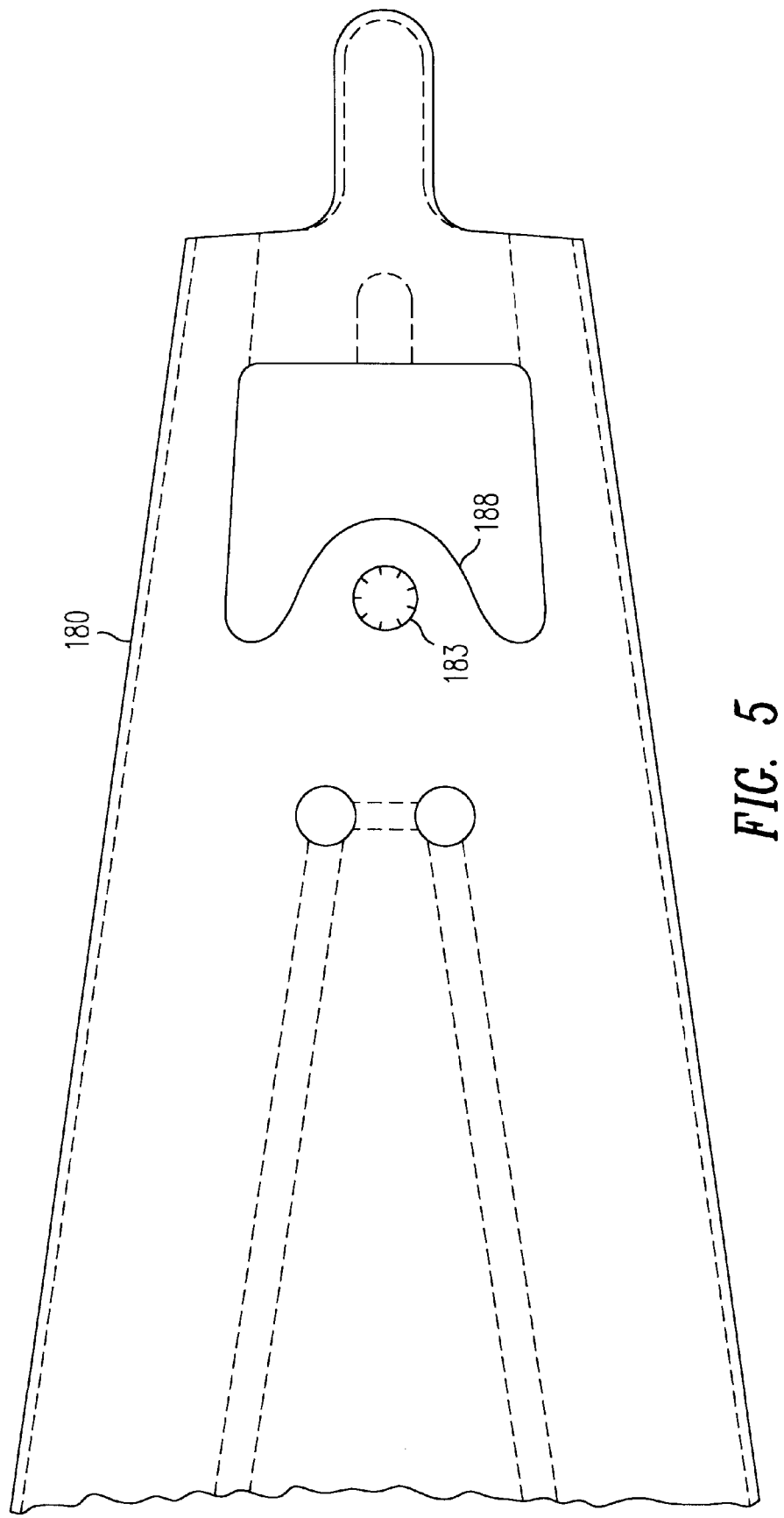
FIG. 5 is a plan view representation of the load beam of FIG. 4.

The micro-actuator and transducer slider are thus mechanically attached to the integrated lead suspension attachment platform 110 and electrically attached to the electrical leads 140–143, and the assembled transducer slider and suspension are attached to a load beam 180 as illustrated in FIGS. 4 and 5.

The load beam supports the assembled transducer slider and suspension against the air bearing by means of a gimbal "dimple" 183. The gimbal dimple allows the attachment platform 110 and the attached micro-actuator and transducer slider to pivot in any direction to follow flatness variations in the data surface of the disk. The flexure operates in a conventional manner to flex legs 150 and 151 and allow full gimbal action about gimbal bump 183 to follow the flatness variations of the disk.

Referring to FIGS. 3–5, conventional load limiters 185 and 186 of the flexure are inserted through cavity 188 in the load beam 180 and, if the slider 100 is lifted off of the disk surface and is no longer loaded against the gimbal dimple, the load limiters 185 and 186 prevent the flexure from moving vertically too far from the load beam 180.

Figure 6:
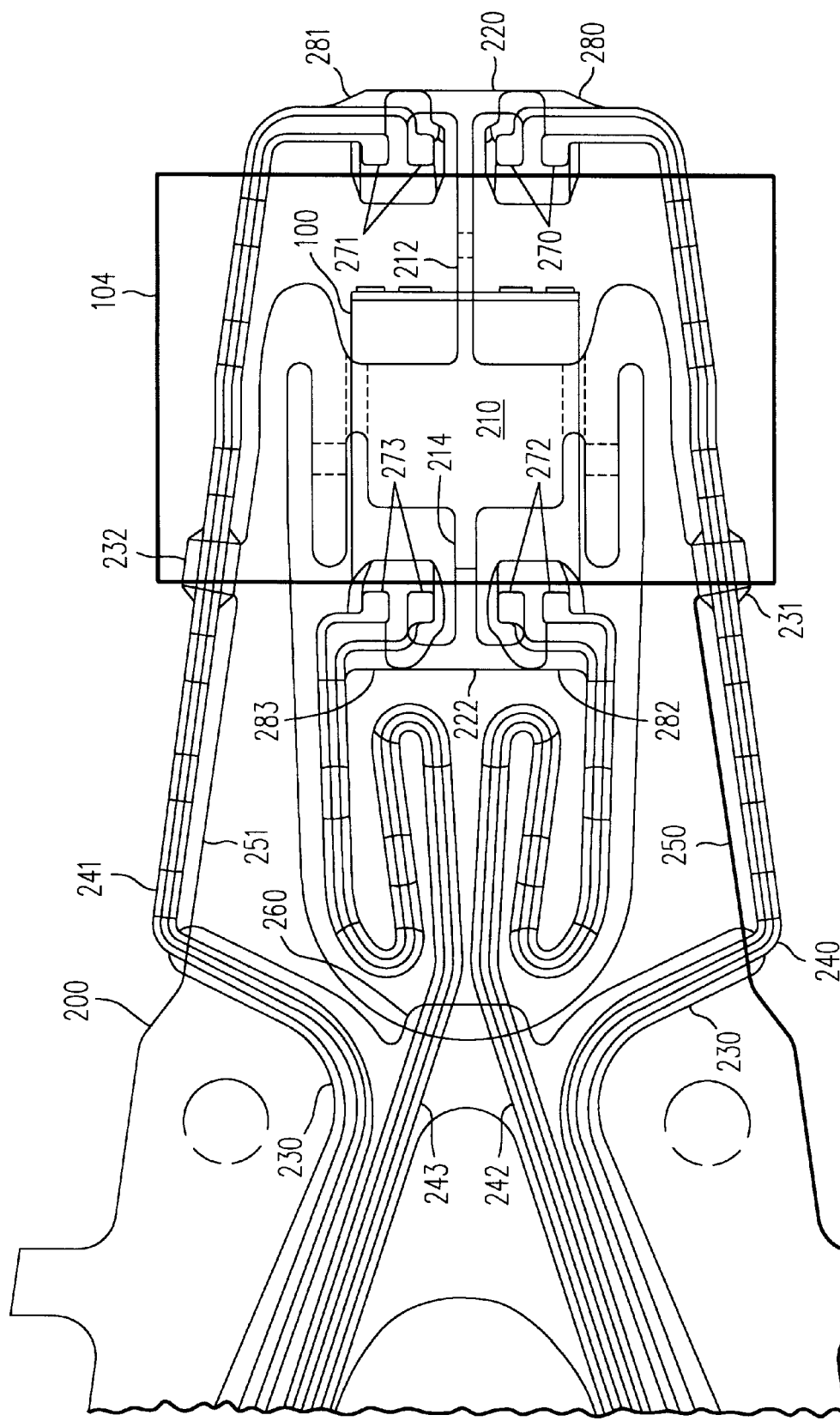
FIG. 6 is a plan view representation of an alternative embodiment of the integrated lead suspension flexure of the present invention with superimposed plan view representation of a micro-actuator and transducer slider.
Figure 7:
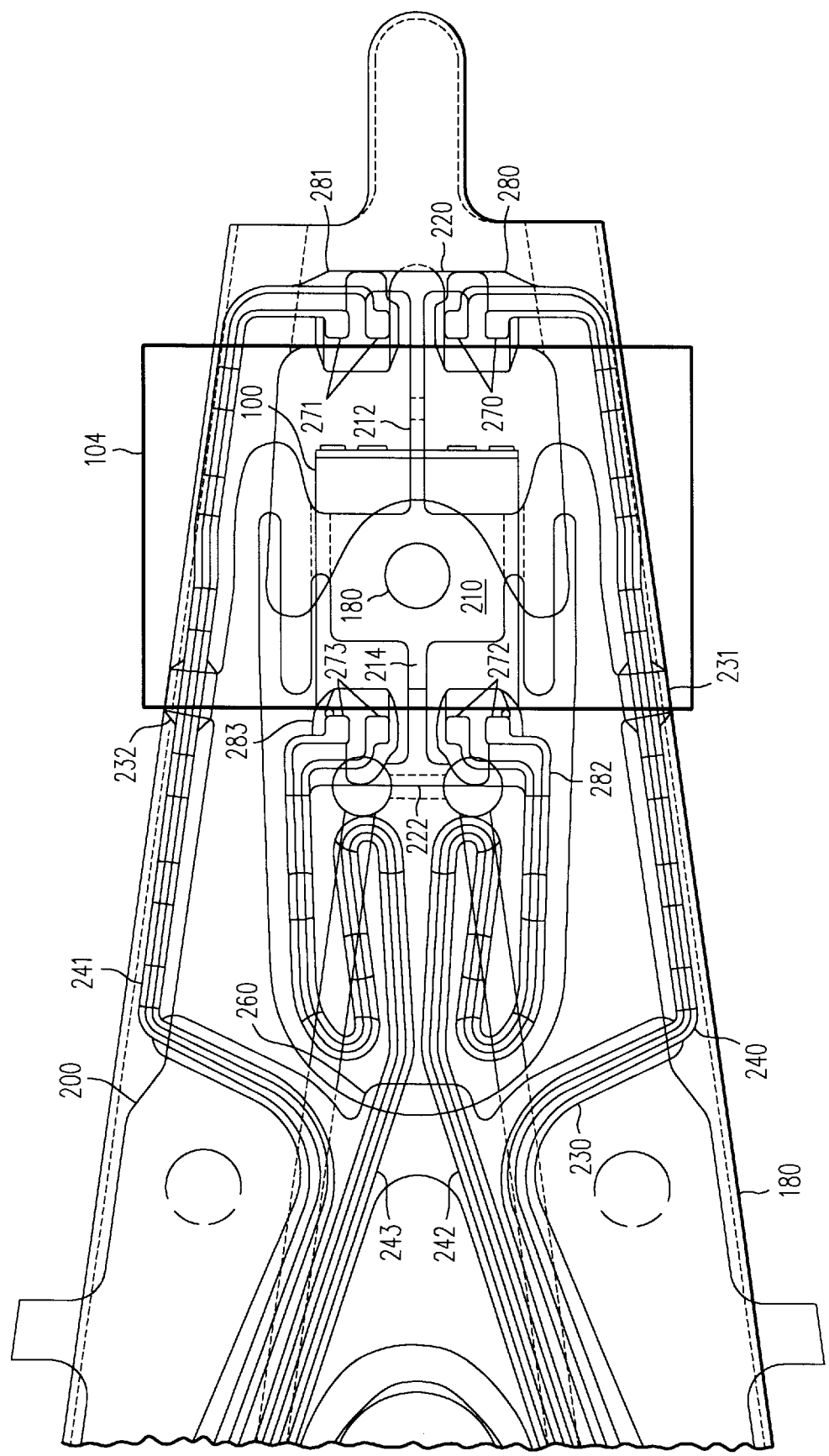
FIG. 7 is a plan view representation of the integrated lead suspension flexure and micro-actuator and transducer slider of FIG. 6, with the superimposed plan view representation of the load beam of FIG. 5.

FIGS. 6 and 7 illustrate an alternative embodiment of the present invention, employing different connections with the electrical terminals of the micro-actuator 104 and the transducer slider 100. In FIG. 6, a flexure 200 is shown superimposed with the micro-actuator 104 and the slider 100. In FIG. 6, the superimposed flexure 200, micro-actuator 104 and the slider 100 are shown further superimposed with the load beam 180 of FIG. 5.

The integrated lead suspension flexure attachment structure of FIGS. 6 and 7, also comprises a composite or laminate structure including the flexure 200, which includes an attachment platform 210 for mechanically attaching the micro-actuator 104 with transducer slider 102. The flexure attachment platform 210 is adhesively bonded to the micro-actuator such that the slider 102 is at a correct orientation to assure that the slider will approach the disk surface at the correct attitude so that it will generate the needed air bearing.

In accordance with the present invention, two elongate cantilever compliance members 212 and 214 extend from opposite edges of the attachment platform 210, each having a cantilever end at the attachment platform 210 and having a distal end. Two lead termination platforms 220 and 222 are provided at the distal ends of the cantilever compliance members 212 and 214, respectively. Again, the cantilever compliance members 212 and 214 may easily flex in the vertical and roll directions, and thus allow the lead termination platforms to similarly move in the vertical direction and rotate in the vertical plane.

The two cantilever compliance members 212 and 214 provide stiffness in the lateral direction and in the yaw direction to insure that the lead termination platforms can be aligned with the electrical terminations 105 for the transducer 102 and the electrical terminations 106 for the micro-actuator 104, as explained above.

Each of the elongate cantilever compliance members 212 and 214 is bent first away from the micro-actuator with a slider/transducer assembly attached thereto and then oppositely to substantially parallel to the flexure attachment platform to thereby vertically space a portion of the elongate cantilever compliance member, the distal end of the elongate cantilever compliance member, and the lead termination platform 220 and 222 from the micro-actuator with a slider/transducer assembly attached thereto. This spacing gives the elongate cantilever compliance members sufficient space in which to twist or to move vertically to provide the above-described freedom of movement.

Electrical insulation 230, 231, and 232, and patterned electrical leads 240–243 are formed on the flexure 200 and separate the electrical leads from the flexure.

Legs 250 and 251 at each side of the attachment platform 210, spaced laterally therefrom, and vertically spaced away from the micro-actuator with a slider/transducer assembly attached thereto. The flexure legs 250 and 251 support a length of each of the ones of the electrical leads 240–241 which are directed to the lead termination platform 220 and the electrical leads 240–241 extend from the flexure legs 250 and 251 from their position on the outside of the platform 210 toward and beyond the elongate cantilever compliance member 212 and loop back to the lead termination platform 220.

The flexure 200 additionally comprises a support area 260 vertically and longitudinally spaced away from the micro-actuator 104 with transducer slider 100. The support area 260 supports a length of each of the ones of the electrical leads 242–243 which are directed to the other of the lead termination platforms 222 and loop from opposite directions toward the elongate cantilever compliance member 214 and to the other lead termination platform 222.

By looping in this manner, the leads 240–243 are more flexible and provide less stiffness than the stiffness of all non-looped leads added together. Thus, the integrated lead suspension flexure attachment structure in accordance with the present invention provides high flexibility to the lead termination platforms 220 and 222 and has minimal impact on gimbal stiffness.

Thus, ones of the plurality of electrical leads are separately supported by each of the two lead termination platforms 220 and 222 and equal numbers of electrical leads are separately routed and supported either side of the lead termination platforms. The leads 240–243 are electrically insulated from the lead termination platforms 220 and 222 by electrical insulation layers 280–283.

In the embodiment of FIGS. 6 and 7, the electrical connections between the electrical leads 240–241 and the terminals 105, and between the electrical leads 242–243 and the terminals 106, are illustrated as "solder ball" connections 270–273. Solder ball lead connections are known to those of skill in the art.

In accordance with the present invention, any suitable connections known to those of skill in the art, such as solder ball, "gold ball", "solder reflow", or "wire stitching", for example, may be utilized to provide connections 270–273 between the electrical leads 240–243 with the terminals 105 for the transducer 102 and with the terminals 106 for the micro-actuator 104. The terminals 105 and 106 may either be at the side or at the top of the micro-actuator 104. In accordance with the present invention, these connections are made with minimal misalignment or springback forces to the attachment of the micro-actuator and transducer slider at attachment platform 210. Misalignments are allowed by the two compliance members 212 and 214 which move in the vertical direction or rotate in the vertical plane, so as to allow freedom of movement in both the vertical direction and in the vertical plane.

At the same time, the two cantilever compliance members 212 and 214 provide stiffness in the lateral direction and in the yaw direction, and insure that the lead termination platforms are aligned with the electrical terminations 105 for the transducer 102 and the electrical terminations 106 for the micro-actuator 104.

Thus, the large number of leads to the micro-actuator and to the transducer are not at one end of the micro-actuator, but rather are split between the two ends. Although there may be a number of individual misalignments with the associated terminals, they do not accumulate due to the flexibility of the elongate cantilever compliance members. Further, minimal springback forces and moments are created. Once the suspension is taken out of a manufacturing fixture there are forces to bias the pitch and roll static attitude of the suspension, and the slider is at the correct orientation to generate the correct air bearing of the disk.

The present invention thus provides an integrated lead suspension for a micro-actuator with a slider/transducer assembly attached thereto which provides low gimbal stiffness and allows the slider to have a correct pitch and roll static attitudes.

Figure 8:
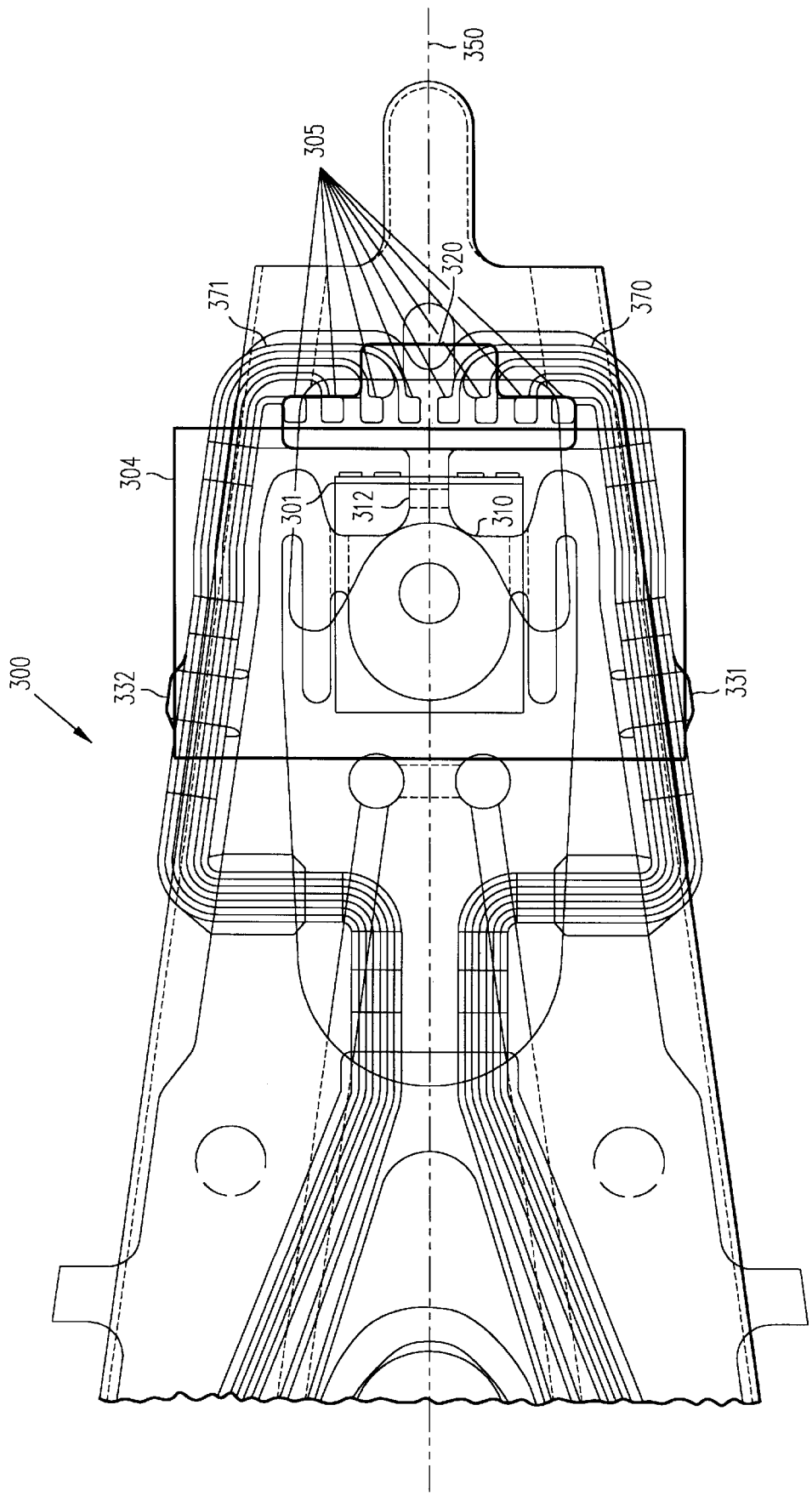
FIG. 8 is a plan view representation of a single-ended integrated lead suspension flexure supporting a micro-actuator.

FIG. 8 illustrates a superimposed single-ended integrated lead suspension structure 300 with a single elongate cantilever compliance member 312 extending from an attachment platform 310. The attachment platform attaches and supports a micro-actuator 304 with transducer slider 301. The elongate cantilever compliance member 312 is positioned along axis 350 which is centered on the attachment platform 310. A lead termination platform 320 is provided at the distal end of the compliance member 312. Electrical leads 370 and 371 are provided on the lead termination platform 320 at each side of the cantilever compliance member 312, and the leads may be symmetrically disposed about the central axis 350. The electrical leads 370 and 371 are supported by tabs 331 and 332, respectively, and all loop outside the elongate cantilever compliance member 312 and the lead termination platform 320 and beyond the lead termination platform, and then back to the lead termination platform 320. The electrical leads 370 and 371 are electrically connected to the terminals 305 for the micro-actuator 304 and transducer slider 301.

Thus, the large number of leads to the micro-actuator and to the transducer are not bunched together, but rather are distributed across the face of the micro-actuator 304, and the leads 370 and 371 are looped so as to provide maximum flexibility. Further, the lead termination platform 320 is allowed to pivot or to be moved into alignment with the terminals 305 due to the flexibility of the elongate cantilever compliance member 312, with minimal springback forces or moments.

While the preferred embodiments of the present invention have been illustrated in detail, it should be apparent that modifications and adaptations to those embodiments may occur to one skilled in the art without departing from the scope of the present invention as set forth in the following claims.

We claim:

1. An integrated lead suspension flexure attachment structure for a micro-actuator with a slider/transducer assembly attached thereto, having a plurality of electrical terminals, said integrated lead suspension flexure attachment structure comprising:

an attachment platform for attaching said micro-actuator with a slider/transducer assembly attached thereto;

two elongate cantilever compliance members extending from opposite edges of said attachment platform, each having a cantilever end at said attachment platform and having a distal end;

two lead termination platforms, one at each distal end of said cantilever compliance members; and a plurality of electrical leads, ones of said leads separately supported by each of said two lead termination platforms for electrically connecting to ones of said plurality of electrical terminals at opposite ends of said micro-actuator with a slider/transducer assembly attached thereto.

2. The integrated lead suspension flexure attachment structure of claim 1, wherein each of said lead termination platforms extends laterally to both sides of said elongate cantilever compliance members substantially equidistant on each said side thereof.

3. The integrated lead suspension flexure attachment structure of claim 1, wherein each of said plurality of electrical leads is positioned laterally of said lead termination platforms and loops towards said elongate cantilever compliance member to said lead termination platform.

4. The integrated lead suspension flexure attachment structure of claim 3, wherein each of said electrical leads is positioned on one of said lead termination platforms to loop from beyond said distal end of said elongate cantilever compliance member back toward said cantilever end of said elongate cantilever compliance member for facing and electrically connecting to said one electrical terminal.

5. The integrated lead suspension flexure attachment structure of claim 3, wherein an equal number of said leads is supported by said lead termination platforms on each side of said cantilever compliance member.

6. The integrated lead suspension flexure attachment structure of claim 1, wherein said elongate cantilever compliance members are positioned along a central axis of said attachment platform.

7. The integrated lead suspension flexure attachment structure of claim 6, wherein each of said lead termination platforms extends laterally to both sides of said central axis substantially equidistant on each said side thereof, and said electrical leads are positioned at each said termination platform symmetrically disposed about said central axis.

8. The integrated lead suspension flexure attachment structure of claim 6, wherein each of said electrical leads includes a a bonding area for electrically connecting to said plurality of electrical terminals.

9. The integrated lead suspension flexure attachment structure of claim 1, wherein each of said elongate cantilever compliance members is bent first away from said micro-actuator with a slider/transducer assembly attached thereto and then oppositely to substantially parallel to said attachment platform to thereby vertically space a portion of said elongate cantilever compliance member, said distal end of said elongate cantilever compliance member, and said lead termination platform from said micro-actuator with a slider/transducer assembly attached thereto.

10. The integrated lead suspension flexure attachment structure of claim 9, additionally comprising flexure legs at each side of said attachment platform, spaced laterally therefrom, and vertically spaced away from said micro-actuator with a slider/transducer assembly attached thereto, said flexure legs supporting a length of each of said ones of said electrical leads which are supported by one of said lead termination platforms, said electrical leads looping therefrom toward said elongate cantilever compliance member and to said one lead termination platform.

11. An integrated lead suspension for a micro-actuator with a slider/transducer assembly attached thereto, having a plurality of electrical terminals, said integrated lead suspension comprising:

a flexure including an attachment platform for attaching said micro-actuator with a slider/transducer assembly attached thereto;

a load beam supporting said flexure;

two elongate cantilever compliance members extending from opposite edges of said attachment platform, each having a cantilever end at said attachment platform and having a distal end;

two lead termination platforms, one at each distal end of said cantilever compliance members; and a plurality of electrical leads, ones of said leads separately supported by each of said two lead termination platforms for electrically connecting to ones of said plurality of electrical terminals at opposite ends of said micro-actuator with a slider/transducer assembly attached thereto.

12. The integrated lead suspension of claim 11, wherein each of said lead termination platforms extends laterally to both sides of said elongate cantilever compliance members substantially equidistant on each said side thereof.

13. The integrated lead suspension of claim 11, wherein each of said plurality of electrical leads is positioned laterally of said lead termination platforms and loops towards said elongate cantilever compliance members to said lead termination platform.

14. The integrated lead suspension of claim 13, wherein each of said electrical leads is positioned on one of said lead termination platforms to loop from beyond said distal end of said elongate cantilever compliance member back toward said cantilever end of said cantilever compliance member for facing and electrically connecting to said one electrical terminal.

15. The integrated lead suspension of claim 14, wherein an equal number of said leads is supported by said lead termination platforms on each side of said cantilever compliance member.

16. The integrated lead suspension of claim 11, wherein said elongate cantilever compliance members are positioned along a central axis of said flexure attachment platform.

17. The integrated lead suspension of claim 16, wherein each of said lead termination platforms extends laterally to both sides of said central axis substantially equidistant on each said side thereof, and said electrical leads are positioned at each said termination platform symmetrically disposed about said central axis.

18. The integrated lead suspension of claim 11, wherein each of said elongate cantilever compliance members is bent first away from said micro-actuator with a slider/transducer assembly attached thereto and then oppositely to substantially parallel to said flexure attachment platform to thereby vertically space a portion of said elongate cantilever compliance member, said distal end of said elongate cantilever compliance member, and said lead termination platform from said micro-actuator with a slider/transducer assembly attached thereto.

19. The integrated lead suspension of claim 18, wherein said flexure additionally comprises legs at each side of said attachment platform, spaced laterally therefrom, and vertically spaced away from said micro-actuator with a slider/transducer assembly attached thereto, said flexure legs supporting a length of each of said ones of said electrical leads which are supported by one of said lead termination platforms, said electrical leads looping therefrom toward said elongate cantilever compliance member and to said one lead termination platform.

20. The integrated lead suspension of claim 19, wherein said flexure additionally comprises a support area vertically spaced away from said micro-actuator with a slider/transducer assembly attached thereto supporting a length of each of said ones of said electrical leads which are supported by the other of said lead termination platforms, said electrical lead lengths positioned laterally from said other lead termination platform, said electrical leads looping therefrom toward said elongate cantilever compliance member and to said other lead termination platform.

21. A transducer slider and suspension assembly comprising:
- a micro-actuator with a slider/transducer assembly attached thereto, having a plurality of electrical terminals;
- a flexure including an attachment platform for attaching said micro-actuator with a slider/transducer assembly attached thereto;
- a load beam supporting said flexure;
- two elongate cantilever compliance members extending from opposite edges of said attachment platform, each having a cantilever end at said attachment platform and having a distal end;
- two lead termination platforms, one at each distal end of said cantilever compliance members; and
- a plurality of electrical leads, ones of said leads separately supported by each of said two lead termination platforms for electrically connecting to ones of said plurality of electrical terminals at opposite ends of said micro-actuator with a slider/transducer assembly attached thereto.

22. The transducer slider and suspension assembly of claim 21, wherein each of said lead termination platforms extends laterally to both sides of said elongate cantilever compliance members substantially equidistant on each said side thereof.

23. The transducer slider and suspension assembly of claim 21, wherein each of said plurality of electrical leads is positioned laterally of said lead termination platforms and loops towards said elongate cantilever compliance members to said lead termination platform.

24. The transducer slider and suspension assembly of claim 23, wherein each of said electrical leads is positioned on one of said lead termination platforms to loop from beyond said distal end of said elongate cantilever compliance member back toward said cantilever end of said cantilever compliance member for facing and electrically connecting to said one electrical terminal.

25. The transducer slider and suspension assembly of claim 24, wherein an equal number of said leads is supported by said lead termination platforms on each side of said cantilever compliance member.

26. The transducer slider and suspension assembly of claim 21, wherein each of said elongate cantilever compliance members is bent first away from said micro-actuator with a slider/transducer assembly attached thereto and then oppositely to substantially parallel to said flexure attachment platform to thereby vertically space a portion of said elongate cantilever compliance member, said distal end of said elongate cantilever compliance member, and said lead termination platform from said micro-actuator with a slider/transducer assembly attached thereto.

27. The transducer slider and suspension assembly of claim 26, wherein said flexure additionally comprises legs at each side of said attachment platform, spaced laterally therefrom, and vertically spaced away from said micro-actuator with a slider/transducer assembly attached thereto, said flexure legs supporting a length of each of said ones of said electrical leads which are supported by one of said lead termination platforms, said electrical leads looping therefrom toward said elongate cantilever compliance member and to said one lead termination platform.

28. The transducer slider and suspension assembly of claim 27, wherein said flexure additionally comprises a support area vertically spaced away from said micro-actuator with a slider/transducer assembly attached thereto supporting a length of each of said ones of said electrical leads which are supported by the other of said lead termination platforms, said electrical lead lengths positioned laterally from said other lead termination platform, said electrical leads looping therefrom toward said elongate cantilever compliance member and to said other lead termination platform.

29. A data recording disk drive comprising:
- at least one disk with at least one data surface of concentric data tracks;
- a motor for rotating said disk about an axis generally perpendicular to said disk;
- a micro-actuator with a slider/transducer assembly attached thereto positioned adjacent to said data surface for reading data from and writing data to said data surface, said micro-actuator with a slider/transducer assembly attached thereto having a plurality of electrical terminals;
- an actuator for moving said micro-actuator with a slider/transducer assembly attached thereto generally radially relative to said data surface;
- an electronics module for processing data read by and written by said micro-actuator with a slider/transducer assembly attached thereto and for supplying signals to said micro-actuator;
- a flexure including an attachment platform for attaching said micro-actuator with a slider/transducer assembly attached thereto;
- a load beam attached to said actuator supporting said flexure;
- two elongate cantilever compliance members extending from opposite edges of said attachment platform, each having a cantilever end at said attachment platform and having a distal end;
- two lead termination platforms, one at each distal end of said cantilever compliance members; and
- a plurality of electrical leads interconnecting said micro-actuator with a slider/transducer assembly attached thereto and said electronics module, ones of said leads separately supported by each of said two lead termination platforms for electrically connecting to ones of said plurality of electrical terminals at opposite ends of said micro-actuator with a slider/transducer assembly attached thereto.

30. The data recording disk drive of claim 29, wherein each of said lead termination platforms extends laterally to both sides of said elongate cantilever compliance members substantially equidistant on each said side thereof.

31. The data recording disk drive of claim 29, wherein each of said plurality of electrical leads is positioned laterally of said lead termination platforms and loops towards said elongate cantilever compliance members to said lead termination platform.

32. The data recording disk drive of claim 31, wherein each of said electrical leads is positioned on one of said lead termination platforms to loop back toward said cantilever end of said cantilever compliance member for electrically connecting to said one electrical terminal.

33. The data recording disk drive of claim 32, wherein an equal number of said leads is supported by said lead termination platforms on each side of said cantilever compliance member.

34. The data recording disk drive of claim 29, wherein each of said elongate cantilever compliance members is bent first away from said micro-actuator with a slider/transducer assembly attached thereto and then oppositely to substantially parallel to said flexure attachment platform to thereby vertically space a portion of said elongate cantilever compliance member, said distal end of said elongate cantilever compliance member, and said lead termination platform from said micro-actuator with a slider/transducer assembly attached thereto.

35. The data recording disk drive of claim 34, wherein said flexure additionally comprises legs at each side of said attachment platform, spaced laterally therefrom, and vertically spaced away from said micro-actuator with a slider/transducer assembly attached thereto, said flexure legs supporting a length of each of said ones of said electrical leads which are supported by one of said lead termination platforms, said electrical leads looping therefrom toward said elongate cantilever compliance member and to said one lead termination platform.

36. The data recording disk drive of claim 35, wherein said flexure additionally comprising a support area vertically spaced away from said micro-actuator with a slider/transducer assembly attached thereto supporting a length of each of said ones of said electrical leads which are supported by the other of said lead termination platforms, said electrical lead lengths positioned laterally from said other lead termination platform, said electrical leads looping therefrom toward said elongate cantilever compliance member and to said other lead termination platform.

* * * * *